United States Patent
Shui

(10) Patent No.: US 9,825,755 B2
(45) Date of Patent: Nov. 21, 2017

(54) CONFIGURABLE CLOCK TREE

(71) Applicant: QUALCOMM Incorporated, San Diego, CA (US)

(72) Inventor: Yaxin Shui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 735 days.

(21) Appl. No.: 14/462,327

(22) Filed: Aug. 18, 2014

(65) Prior Publication Data

US 2015/0063377 A1 Mar. 5, 2015

Related U.S. Application Data

(60) Provisional application No. 61/872,547, filed on Aug. 30, 2013.

(51) Int. Cl.
 *H04L 7/00* (2006.01)
 *G06F 13/42* (2006.01)
 *G06F 1/10* (2006.01)

(52) U.S. Cl.
 CPC .............. *H04L 7/0037* (2013.01); *G06F 1/10* (2013.01); *G06F 13/4273* (2013.01)

(58) Field of Classification Search
 CPC ....... H04L 7/0037; G06F 1/10; G06F 13/4273
 USPC .......................................................... 370/517
 See application file for complete search history.

(56) References Cited

U.S. PATENT DOCUMENTS

| | | |
|---|---|---|
| 7,978,802 B1 | 7/2011 | Raha et al. |
| 8,081,706 B2 | 12/2011 | Shumarayev et al. |
| 8,130,019 B1 * | 3/2012 | Awad ......................... G06F 1/10 327/291 |
| 8,411,703 B1 | 4/2013 | Cory |
| 2006/0233036 A1 * | 10/2006 | Blodgett .............. G11C 7/1072 365/230.01 |
| 2008/0270818 A1 | 10/2008 | Joordens |
| 2009/0154285 A1 * | 6/2009 | Pyeon .................... G11C 5/025 365/233.1 |
| 2009/0213275 A1 * | 8/2009 | Trager ..................... H04N 5/44 348/729 |

(Continued)

FOREIGN PATENT DOCUMENTS

| | | |
|---|---|---|
| WO | WO-9110951 A1 | 7/1991 |
| WO | WO-9420898 A1 | 9/1994 |

OTHER PUBLICATIONS

International Search Report and Written Opinion—PCT/US2014/051756—ISA/EPO—dated Nov. 18, 2014.

*Primary Examiner* — Andrew Chriss
*Assistant Examiner* — Ellen Kirillova
(74) *Attorney, Agent, or Firm* — Loza & Loza, LLP

(57) ABSTRACT

System, methods and apparatus are described that facilitate transmission of data, particularly between two devices within an electronic apparatus. A configurable clock tree includes a delay matrix that may be configured such that each the timing of clocks for each of a plurality of data lanes can be optimized for minimum skew. Selections between different versions of a base clock signal and different paths available to the selected version may provide a root clock used for transmitting data on a communications link. The versions of the one or more clock signals may include three versions of a first clock signal. Each version of the first clock signal may be subject to a different delay with respect to the clock signal.

29 Claims, 14 Drawing Sheets

(56) References Cited

U.S. PATENT DOCUMENTS

| | | | |
|---|---|---|---|
| 2010/0008460 A1* | 1/2010 | Zhang | H04L 25/14 375/376 |
| 2010/0090738 A1 | 4/2010 | Changchein et al. | |
| 2011/0148486 A1* | 6/2011 | Mosalikanti | H03K 5/15 327/158 |
| 2014/0062559 A1 | 3/2014 | Gonzalez et al. | |

* cited by examiner

CONFIGURABLE CLOCK TREE

CROSS-REFERENCE TO RELATED APPLICATIONS

The present Application for Patent claims priority to Provisional Application No. App. No. 61/872,547, entitled "Configurable Clock Tree" filed Aug. 30, 2013, which is assigned to the assignee hereof and hereby expressly incorporated by reference herein.

TECHNICAL FIELD

At least one aspect generally relates to high-speed data communications interfaces, and more particularly, to management of clock skew in multi-lane data links.

BACKGROUND

Data communications links are frequently used to connect components, devices and circuits in electronic equipment. Certain communications links are used that comply or are compatible with industry standards and manufacturers of the electronic equipment and constituent components, devices and circuits must meet specified timing of clock and data signals, particularly where the manufacturer has little or no control over the design and operation of one or more components connected to the data communications link. For example, manufacturers of mobile devices, such as cellular phones, may obtain components of the mobile devices from various sources, including different manufacturers. In one example, the application processor in a cellular phone may be obtained from a first manufacturer, while the display for the cellular phone may be obtained from a second manufacturer. Standards may be defined for interconnecting certain components of the mobile devices, including connections between an application processor and a display within the mobile device. Some displays provide an interface that conforms to the Display System Interface (DSI) standard specified by the Mobile Industry Processor Interface Alliance (MIPI).

Of particular importance, are the relationships between transmitted data and the transmit and receive clocks used to send and receive the transmitted data. The transmitter is typically designed to minimize the skew between edges of different data signals and between data and clock signals. The receiver samples data on rising edges, falling edges or between successive edges. Timing skew can decrease timing windows available for reliable data capture. As speed of communications increases, skew between data signals, clock signals and between clock and data signals can limit the data transmission rates.

SUMMARY

Certain embodiments disclosed herein employ a configurable clock tree that can configure, minimize, or otherwise optimize clock skew between clock signals and/or data signals transmitted on a communications link. The configurable clock tree may include a delay matrix that can be configured to provide a plurality of clock lanes. The configurable clock tree may be provided in an Integrated Circuit (IC) device that is communicatively coupled by a data communications link to one or more other IC devices in an electronic apparatus.

In various aspects of the disclosure, a method for data communications includes selecting between versions of one or more clock signals as an output of a first-level delay element of a first lane, providing the output of the first-level delay element of the first lane to second-level delay elements in second and third lanes, and providing a root clock used to control transmission of data on a communications link by selecting between the output of the first-level delay element of the first lane and outputs of first-level delay elements of the second and third lanes. The versions of the one or more clock signals may include at least two versions of a first clock signal. Each version of the first clock signal may be subject to a different delay with respect to the first clock signal.

In an aspect of the disclosure, the first lane may have a transistor path that matches a transistor path of one or more data lanes of the communications link.

In an aspect of the disclosure, the first, second and third lanes may each provide a clock to be used in a corresponding data lane. Inputs for the first level delay element of the first lane and inputs for a second-level delay element in the first lane may be selected to minimize skew between the root clock and the clocks provided by the second and third lanes. Inputs for first level delay elements of the second and third lanes and the inputs for second-level delay elements of the second and third lanes may be selected to minimize skew between the root clock and the clocks provided by the second and third lanes. Inputs for first level delay elements of the second and third lanes and the inputs for second-level delay elements of the second and third lanes may be selected to minimize skew between data lanes associated with the root clock and data lanes associated with the clocks provided by the second and third lanes.

In an aspect of the disclosure, the communications link includes differentially encoded data and clock signals. The communications link may communicatively couple a first IC device with a second IC device.

In an aspect of the disclosure, the one or more clock signals may include a left clock signal that is delayed by one or more of a first plurality of delay elements that includes a number of delay elements corresponding to a number of data lanes disposed to the left of a first data lane on an IC. The one or more clock signals may include a right clock signal that is delayed by one or more of a second plurality of delay elements that includes a number of delay elements corresponding to a number of data lanes disposed to the right of the first data lane. The left clock signal, or a version thereof, may be selected as an output of the first-level delay element. The right clock signal, or a version thereof, may be selected as an output of the first-level delay element.

In an aspect of the disclosure, each delay element may be in an active clocking mode and a power-down mode. One or more delay elements that do not contribute to the provision of the root clock may be powered down.

In various aspects of the disclosure, an apparatus includes an interface to a communications link that communicatively couples a first IC device with a second IC device, means, circuits and/or modules for selecting between versions of one or more clock signals as an output of a first-level delay element of a first clock lane, and means, circuits or modules for providing a root clock as an output of the first clock lane. The root clock may be used for transmitting data on the communications link. The versions of the one or more clock signals may include at least two versions of a first clock signal, where each version of the first clock signal is subject to a different delay with respect to the first clock signal. The root clock may be provided by configuring selection logic to select between the output of the first-level delay element of the first clock lane and outputs of first-level delay elements of a plurality of other clock lanes.

In an aspect of the disclosure, the first clock lane has a transistor path that matches a corresponding transistor path in one or more data lanes.

In an aspect of the disclosure, the root clock and output clocks provided by the plurality of other clock lanes are used in corresponding data lanes. The inputs for the first level delay element of the first clock lane and the inputs for a second-level delay element in the first clock lane may be selected to minimize skew between the root clock and the output clocks provided by the plurality of other clock lanes. The inputs for first level delay elements of the plurality of other clock lanes and the inputs for second-level delay elements of the plurality of other clock lanes may be selected to minimize skew between the root clock and the output clocks provided by the plurality of other clock lanes. The inputs for first level delay elements of the plurality of other clock lanes and the inputs for second-level delay elements of the plurality of other clock lanes may be selected to minimize skew between data lanes associated with the root clock and data lanes associated with the output clocks provided by the plurality of other clock lanes.

In an aspect of the disclosure, the one or more clock signals includes a left clock signal that is delayed by one or more of a first plurality of delay elements and a right clock signal that is delayed by one or more of a second plurality of delay elements. The first plurality of delay elements may include a number of delay elements corresponding to a number of data lanes disposed to the left of a first data lane on an IC. The second plurality of delay elements may include a number of delay elements corresponding to a number of data lanes disposed to the right of the first data lane. Certain logic may be configured to select the left clock signal or the right clock signal as the first clock signal.

In an aspect of the disclosure, the first and second level delay elements may include multiplexing logic. Multiplexing logic that does not provide an output used to provide the root clock may be powered down. Control logic may be configured to select between an active clocking mode and a power-down mode for portions of the multiplexing logic in first level delay elements and/or second-level delay elements.

In an aspect of the disclosure, a clock delay matrix includes a plurality of clock lanes provided in an IC device, first-level multiplexing logic configured to select between versions of one or more first-level clock signals, second-level multiplexing logic configured to provide a root clock by selecting between an output of the first-level multiplexing logic and outputs of first-level multiplexing logic of two other clock lanes, and a controller that configures the first-level multiplexing logic and the second-level multiplexing logic of the plurality of clock lanes. Each clock lane may be configurable to provide a clock for controlling data transmissions in a corresponding data lane of a communications interface. The controller may be configured to control clock skew between outputs of the plurality of clock lanes.

In an aspect of the disclosure, each clock lane has a transistor path that matches a transistor path in a corresponding data lane.

In an aspect of the disclosure, the outputs of the plurality of clock lanes may be used to control a corresponding plurality of data lanes. The controller may control clock skew by configuring the first level multiplexing logic and the second-level multiplexing logic in each clock lane to minimize skew between outputs of the each clock lane and the two other clock lanes. The controller may control clock skew by configuring the first level multiplexing logic and the second-level multiplexing logic in each clock lane to minimize skew between data signals transmitted on the communications interface. The controller may control clock skew by configuring the first level multiplexing logic and the second-level multiplexing logic in each clock lane to minimize skew between clock and data signals transmitted on the communications interface.

In an aspect of the disclosure, the one or more first-level clock signals includes a left clock signal that is delayed by one or more of a first plurality of delay elements and a right clock signal that is delayed by one or more of a second plurality of delay elements. The first plurality of delay elements may include a number of delay elements corresponding to a number of data lanes disposed to the left of a first data lane on the IC. The second plurality of delay elements may include a number of delay elements corresponding to a number of data lanes disposed to the right of the first data lane. Base clock selection logic may be provided and/or configurable to select the left clock signal or the right clock signal as a first-level clock signal. The one or more first-level clock signals may include the left clock signal and the right clock signal. The one or more first-level clock signals may include versions the left clock signal and the right clock signal.

In an aspect of the disclosure, multiplexing logic that does not provide an output used to provide the root clock may be powered down. The controller may be configured to select between an active clocking mode and a power-down mode for portions of the first level multiplexing logic and the second-level multiplexing logic.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
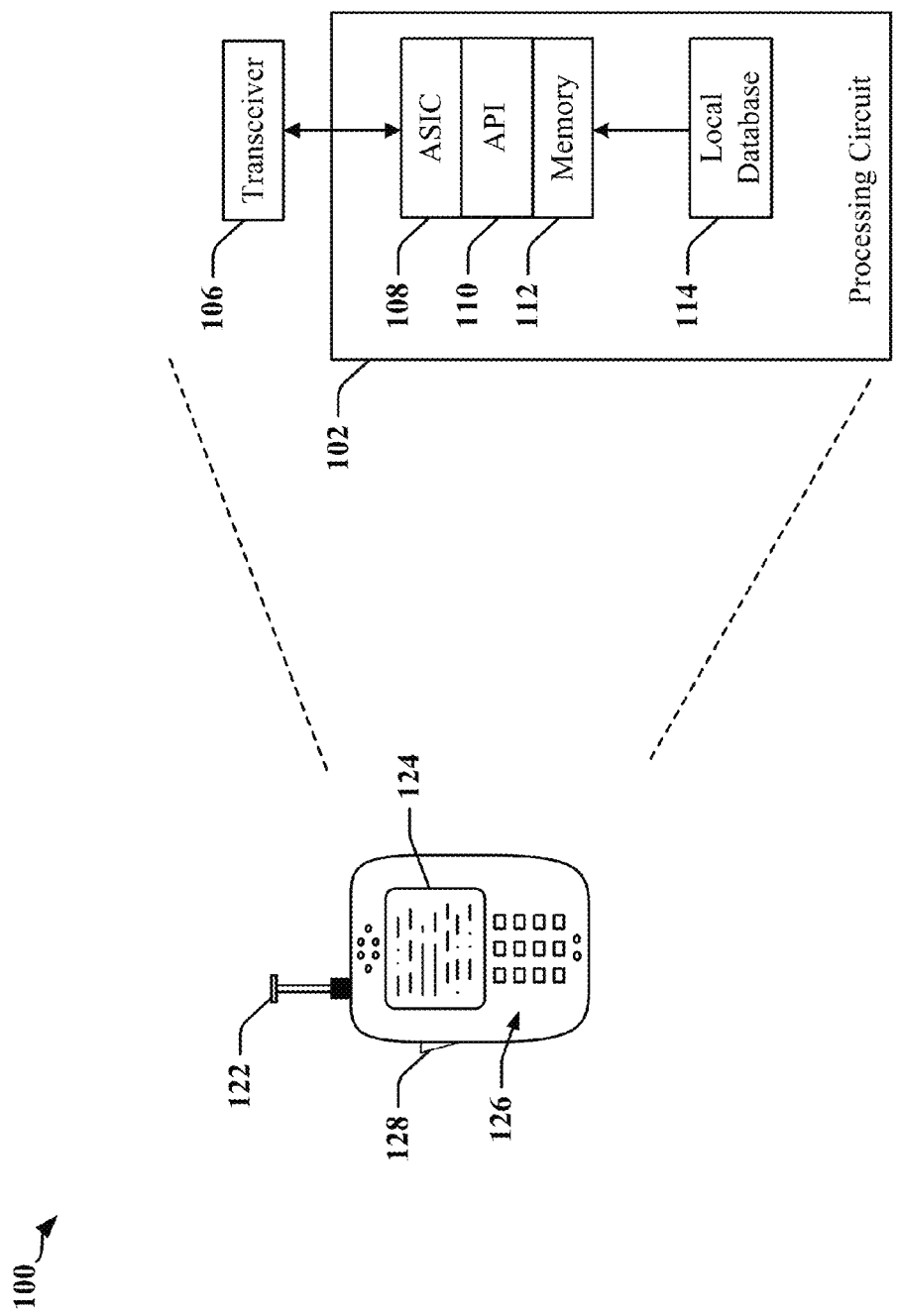
FIG. 1 illustrates an apparatus employing a data link between IC devices that selectively operates according to one of plurality of available standards.

Certain aspects of the invention may be applicable to communications links deployed between electronic components, including subcomponents of a device, such as a telephone, a mobile computing device, an appliance, an automobile electronics, an avionics system, etc. FIG. 1 depicts an example of an apparatus 100 employing a data link between IC devices, where the data link may selectively operate according to one of plurality of available standards. The apparatus 100 may include a wireless communication device that communicates wirelessly with a radio access network (RAN), a core access network, the Internet and/or another network. The apparatus 100 may include a communications transceiver 106 operably coupled to a processing circuit 102. The processing circuit 102 may include one or more IC devices, such as an application-specific IC (ASIC) 108. The ASIC 108 may include one or more processing devices, sequencers, logic circuits, and so on. The processing circuit 102 may include and/or be coupled to processor readable storage such as a memory device 112 that may maintain instructions and data the may be executed and otherwise used by the processing circuit 102. The processing circuit 102 may be controlled by one or more of an operating system and an application programming interface (API) 110 layer that supports and enables execution of software modules residing in the memory device 112. The memory device 112 may include read-only memory (ROM) and/or random-access memory (RAM), electrically-erasable programmable read only memory (EEPROM), a flash memory device, or any memory device that can be used in processing systems and computing platforms. The processing circuit 102 may include and/or access a local database 114 that can maintain operational parameters and other information used to configure and operate the apparatus 100. The local database 114 may be implemented using one or more of a database module or server, flash memory, magnetic media, EEPROM, optical media, tape, soft or hard disk, or the like. The processing circuit may also be operably coupled to external devices such as an antenna 122, a display 124, operator controls, such as a button 128 and a keypad 126, among other components.

Figure 2:
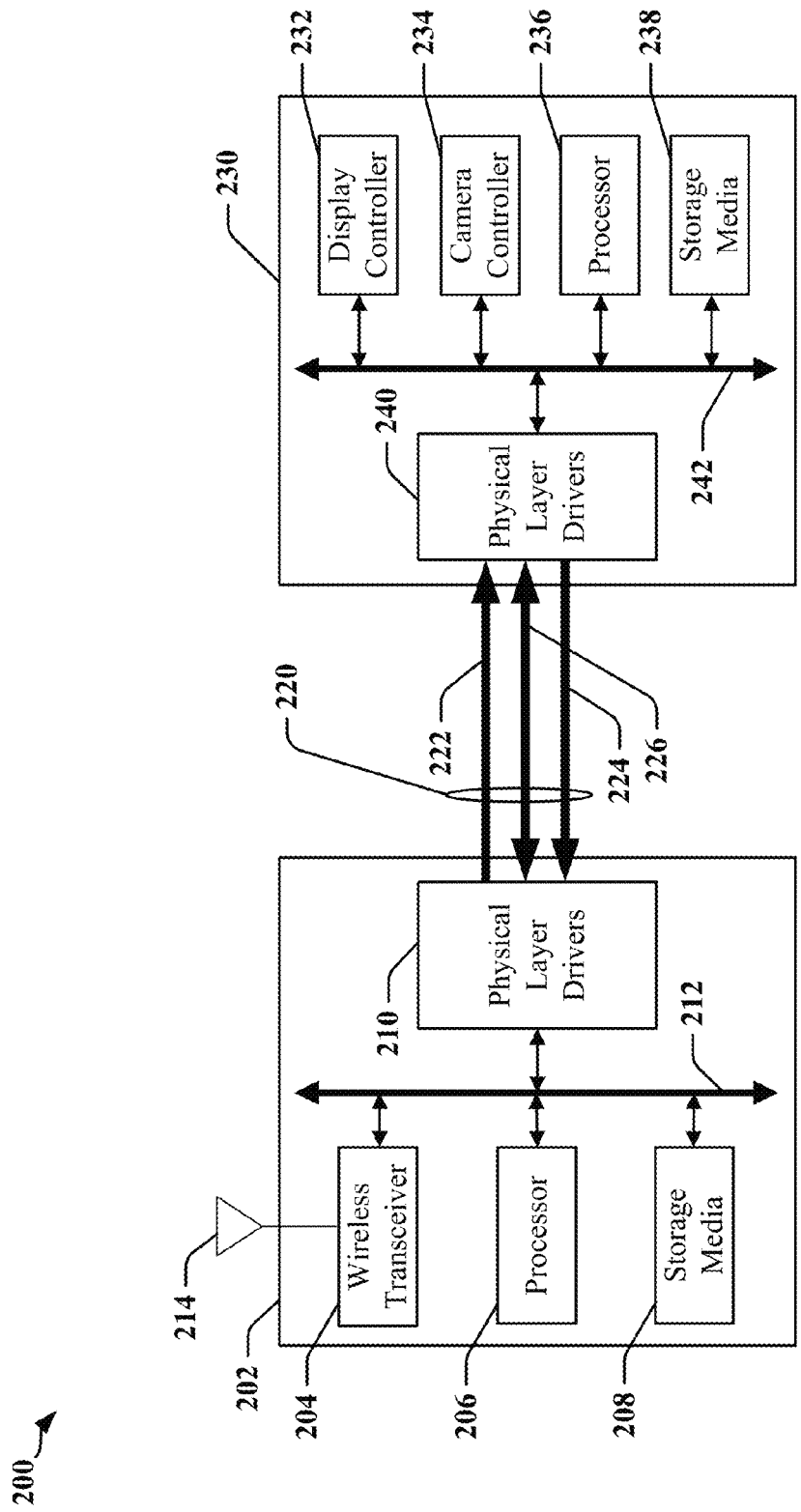
FIG. 2 illustrates a system architecture for an apparatus employing a data link between IC devices.

FIG. 2 is a block schematic diagram illustrating certain aspects of an apparatus 200 such as a wireless mobile device, a mobile telephone, a mobile computing system, a wireless telephone, a notebook computer, a tablet computing device, a media player, a gaming device, or the like. The apparatus 200 may include a plurality of IC devices 202 and 230 that exchange data and control information through a communications link 220. The communications link 220 may be used to interconnect the IC devices 202 and 222, which may be located in close proximity to one another or physically located in different parts of the apparatus 200. In one example, the communications link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communications link 220 may include a cable or optical connection.

The communications link 220 may include multiple channels 222, 224 and 226. One or more channel 226 may be bidirectional, and may operate in half-duplex and/or full-duplex modes. One or more channel 222 and 224 may be unidirectional. The communications link 220 may be asymmetrical, providing higher bandwidth in one direction. In one example described herein, a first communications channel 222 may be referred to as a forward link 222 while a second communications channel 224 may be referred to as a reverse link 224. The first IC device 202 may be designated as a host system or transmitter, while the second IC device 230 may be designated as a client system or receiver, even if both IC devices 202 and 230 are configured to transmit and receive on the communications link 222. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each include a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface, manage or operate a display controller 232, and/or control operations of a camera or video input device using a camera controller 234. Other features supported by one or more of the IC devices 202 and 230 may include a keyboard, a voice-recognition component, and other input or output devices. The display controller 232 may include circuits and software drivers that support a display such as a liquid crystal display (LCD) panel, a touch-screen display, an indicator and so on. The storage media 208 and 238 may include transitory and/or non-transitory storage devices adapted to maintain instructions and data used by the respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse link 224 may be operated in the same manner as the forward link 222, and the forward link 222 and the reverse link 224 may be capable of transmitting at comparable speeds or at different speeds, where speed may be expressed as data transfer rate and/or clocking rates. The forward and reverse data rates may be substantially the same or may differ by orders of magnitude, depending on the application. In some applications a bidirectional link 226 may support communications between the first IC device 202 and the second IC device 230. The forward link 222 and/or the reverse link 224 may be configurable to operate in a bidirectional mode when, for example, the forward and reverse links 222 and 224 share the same physical connections and operate in a half-duplex manner.

In one example, the communications link 220 may be operated to communicate control, command and other information between the first IC device 202 and the second IC device 230 in accordance with an industry or other standard. Industry standards may be application specific. For example, the MIPI standard defines physical layer interfaces including a synchronous interface specification (D-PHY) between an application processor IC device 202 and an IC device 230 that supports the camera or display in a mobile device. The D-PHY specification governs the operational characteristics of products that comply with MIPI specifications for mobile devices. A D-PHY interface may support data transfers using a flexible, low-cost, high-speed serial interface that interconnects IC devices 202, 230 and/or other components within a mobile device. These interfaces may include complimentary metal-oxide-semiconductor (CMOS) compatible parallel busses providing relatively low bit rates with slow edges to avoid electromagnetic interference (EMI) issues.

Figure 3:
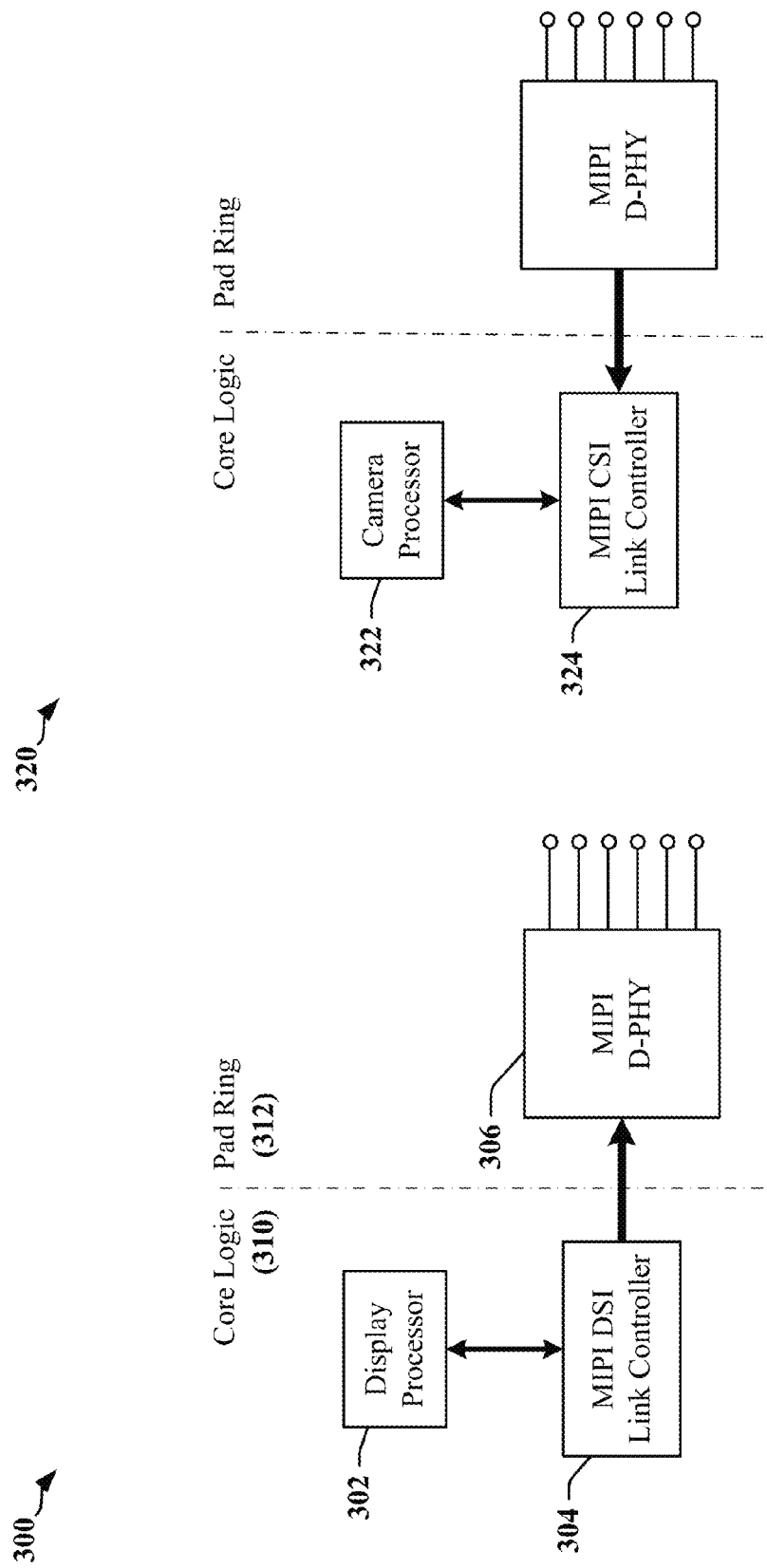
FIG. 3 illustrates simplified examples of systems that may be adapted to include certain clocking techniques provided according to certain aspects disclosed herein.

FIG. 3 illustrates simplified examples 300, 320 of systems that may be adapted to include certain of the clocking techniques, apparatus and methods disclosed herein. In a first example, 300, a display processor 302 generates display data for a display device 124 (see FIG. 1). The display processor 302 may be integrated with a processing circuit 206 (see FIG. 2), for example. Data may be transmitted through a communications link 220 to a device 230 that includes a display controller 232.

The communications link 220 may be configurable and may comply or be compatible with a MIPI standard DSI interface as described herein. Display pixel data originating from display processor 302 is provided to MIPI DSI Link Controller 304, which formats the display pixel data into packets to be sent over a high-speed serial interface to the display, typically through the display controller 232. Both display pixel data and control information may be transmitted over this link 220.

In a second example, 320, a camera processor 322 receives camera data from a camera or imaging device. The camera processor 322 may be integrated with a processing circuit 206 (see FIG. 2). In one example, the camera processor 322 may be implemented using a processing circuit 206 that is adapted to perform certain core functions in a wireless processing or communications device. Image data may be received from a device 230 through a communications link 220 that includes a camera controller 234.

The communications link 220 may be configurable and may comply or be compatible with a Camera Serial Interface (CSI) as defined by MIPI specifications. Image pixel data may be received using a MIPI CSI Link Controller 324. Both image pixel data and camera control information may be transmitted over this link 220.

Certain aspects of this disclosure may be described in reference to the first example 300 in FIG. 3, which illustrates a MIPI DSI link. It will be appreciated that the concepts and principles disclosed herein are applicable to other types of communication link, including the MIPI CSI link illustrated in the second example 320 in FIG. 3.

In the first example 300, data packets generated by the MIPI DSI Link Controller 304 in the digital core logic circuitry 310 of an integrated circuit (IC) device may be provided to a MIPI D-PHY Pre-Driver 306, which may be realized in an input/output section (PAD Ring) 312 of the IC device. The data packets may be provided to a set of output drivers, such as differential line drivers for example. An IC device may communicate with external devices through bonding pads that may be provided in the PAD Ring 312 that is arranged around the digital core logic circuitry 310. Power supplies may also be provided through bonding pads. In some instances, devices provided in the core logic section 310 and circuits used to transmit signals through output pads and receive signals through input pads may have different operational characteristics, including different maximum switching frequencies, and/or different maximum voltage and current levels.

Figure 4:
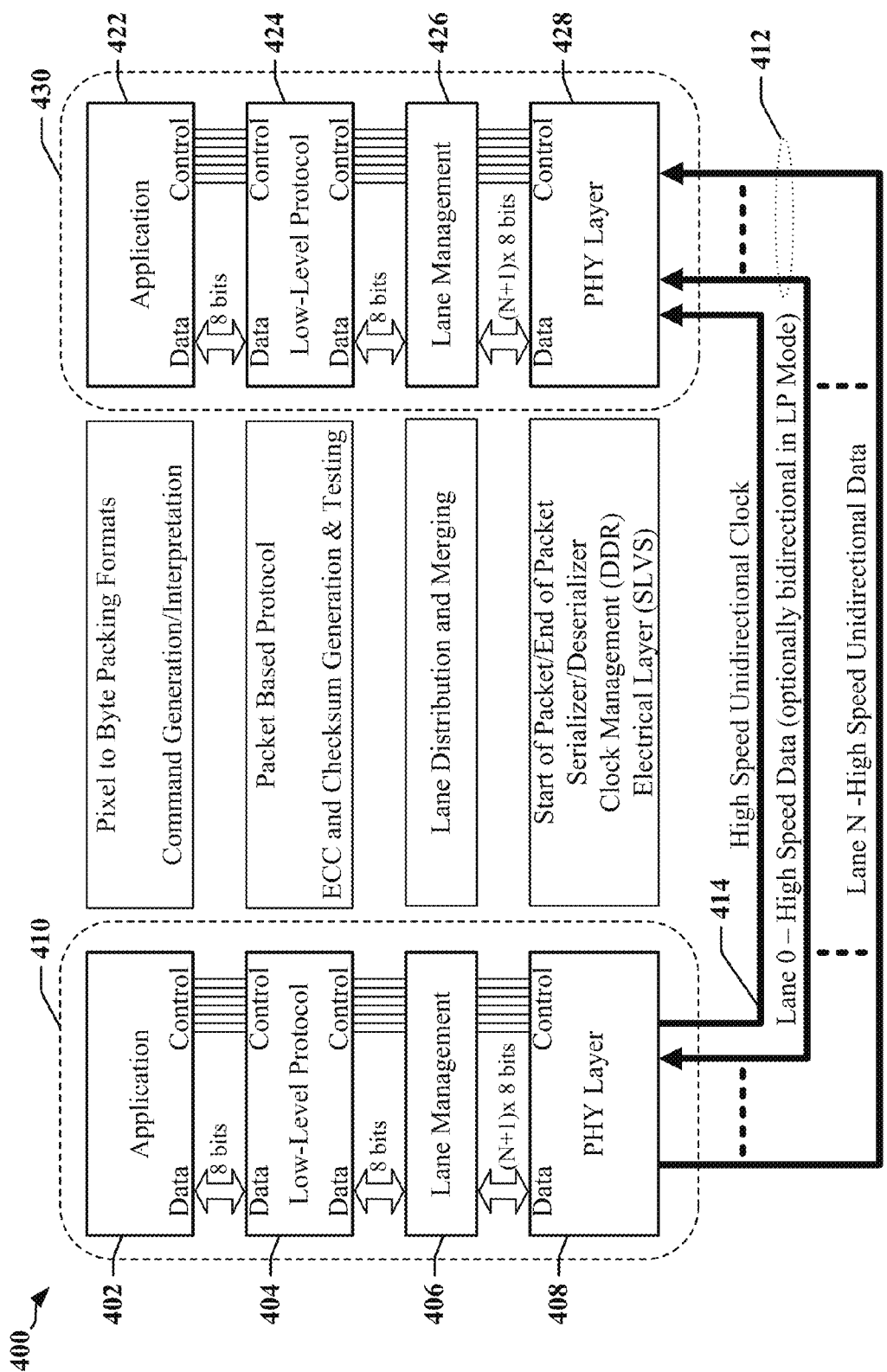
FIG. 4 is a block diagram 400 illustrating the architecture of a typical MIPI-compliant D-PHY system.

FIG. 4 is a diagram illustrating the architecture of one example of a MIPI-compliant D-PHY system 400. The illustrated D-PHY system 400 includes a first device 410, which may serve as a transmitter, server, or master device, and a second device 430, which may operate as a receiver, client or slave device. Application layer software 402 and 422 may communicate using a protocol 404 and 424 that enables data and control information to be transmitted through lower level software and hardware components 406, 408, 426, and 428. In one example, data is transferred over a plurality of lanes 412 of the communications link, under the supervision and control of lane management modules 406 and 426. Data transmission between the devices 410 and 430 occurs at the physical layer (PHY) using circuits and modules 408 and 428 that drive the physical connections 412. In some instances, one or more high-speed unidirectional clocks 414 may be provided between the devices 410, 430 to control data transfers over the physical connections 412. The physical connections 412 may support multiple data lanes, which may include unidirectional and/or bidirectional lanes. The master device 410 typically provides the high-speed unidirectional clock signals 414 that enable a receiver 430 to decode the data from the data lanes of physical connections 412. The clock signals 414, and other timing signals or clocks may be generated by the PHY layer 408 and/or 428, or provided to the PHY layer 408 and/or 428 by specialized or customized clocking logic.

Figure 5:
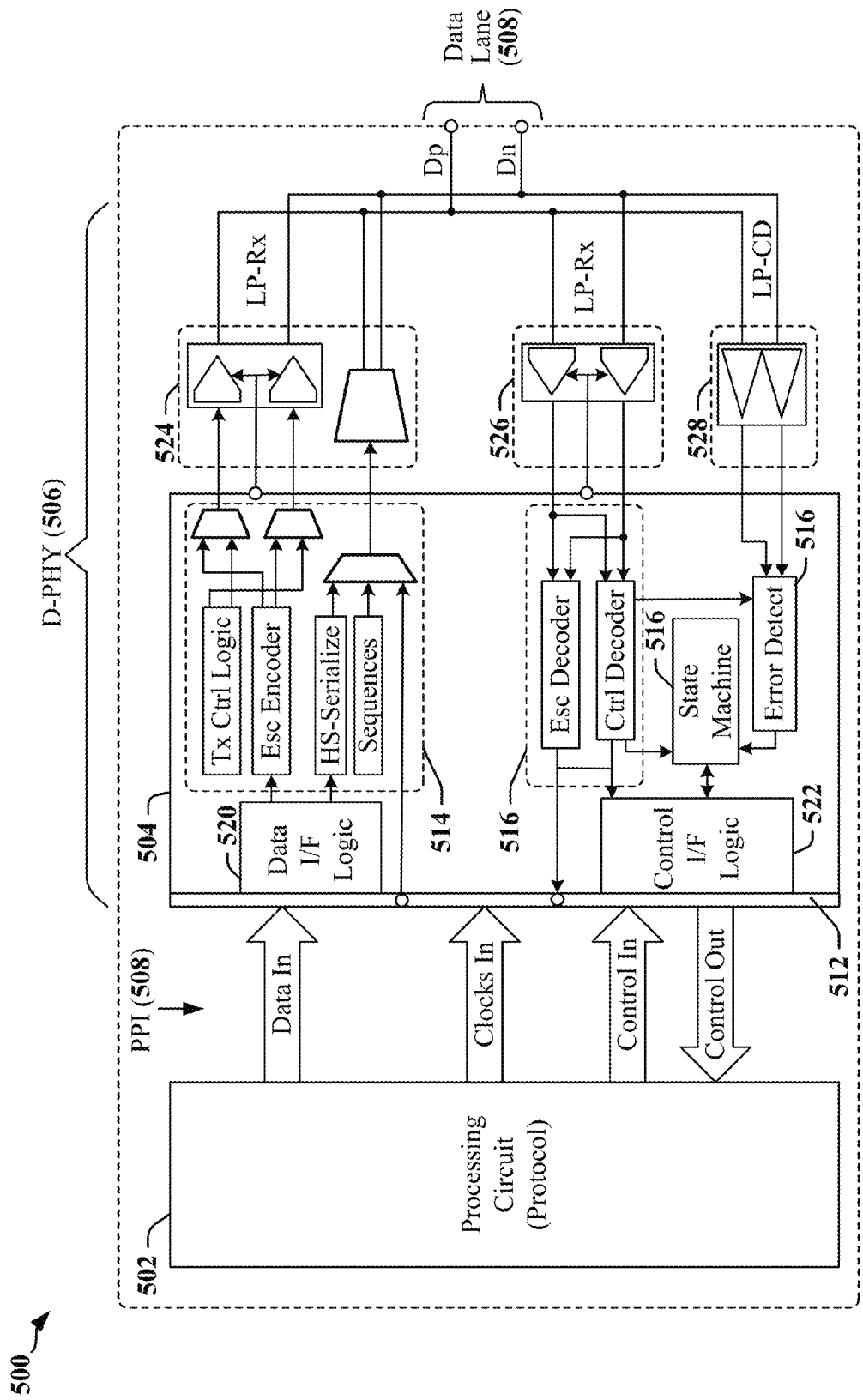
FIG. 5 is a block diagram illustrating an example of a MIPI-compliant D-PHY lane transceiver according to certain aspects disclosed herein.

FIG. 5 is a block diagram illustrating an example of a MIPI-compliant D-PHY lane transceiver 500. The lane transceiver 500 may be used for communications through the connectors of one data lane 508 of a D-PHY interface. The lane transceiver 500 may include transmitter circuits and/or modules 514, 524 and receiver circuits and/or modules 516, 526 that operate under control of higher-level modules and that may use one or more clocks that may be generated internally, derived from externally generated clock signals, or some combination thereof.

A processing circuit 502 may be configured to handle various aspects of the protocols used to communicate information over the data lane 508. The processing circuit 502 may be adapted or configured to implement one or more protocols, such as the DSI protocol, the CSI protocol, and/or the MIPI unified protocol (UniPro). Data and control signals may be communicated between the processing circuit 502 and a transceiver 504 or other device configured to generate signals that can be transmitted on the data lane 508. In one example, data and control signals may be communicated using a PHY Protocol Interface (PPI). For the purposes of this discussion, it can be assumed that data and control signals are distributed within the transceiver 504 using a network of connections 512 that may include one or more buses, or the like.

The transceiver may include a data interface 520 and a control interface 522 that encode, transmit, receive and decode signals exchanged with the processing circuit 502. In some instances, certain common logic may be shared between the data interface 520 and the control interface 522. The transceiver 504 may include transmit logic that can select between data streams that may include data provided by the processing circuit in accordance with one or more data transmission protocols, predefined sequences of bits and other control information. In one example, a packet of data received from the processing circuit may be serialized for transmission on the data lane 508. Serialized data may then be provided to differential line drivers for transmission on the physical connectors corresponding to the data lane 508.

Differential receivers 526 may be configured to receive information from the physical connectors corresponding to the data lane 508. The differential receivers 526 may be coupled to decoding circuits 506 that provide decoded data and control information that may be transmitted to the processing circuit 502. In some instances, line-monitoring circuits 528 may support error detection logic 516 that may be used to ensure reliable communication over the data lane 508. A state machine or other processor 516 may be provided to control communications operations associated with the data lane 508.

The MIPI D-PHY layer enables significant extension of interface bandwidths for more advanced applications such as mobile display and cameras. A high speed, low power, source-synchronous multiple data lane module interface protocol provides up to 1.5 gigabits per second per data lane. Due to the very tight lane skew specification along with 90-degree phase shift clock lane, data and clock lane paths must typically be identical in order to ensure the same data path delay. Clock trees used by the D-PHY are dependent on the number of data lanes in service and the clock tree root may be required to have a fixed clock lane location.

As described herein, a configurable clock tree is described whereby a number of data lanes can be configured as multiple D-PHY links, and any data lane can be configured as clock lane with fixed cyclic data pattern. In order to configure any lane to be clock lane and clock tree root, a configurable clock delay cell may be used for multi-lane source synchronized protocol interfaces.

Figure 6:
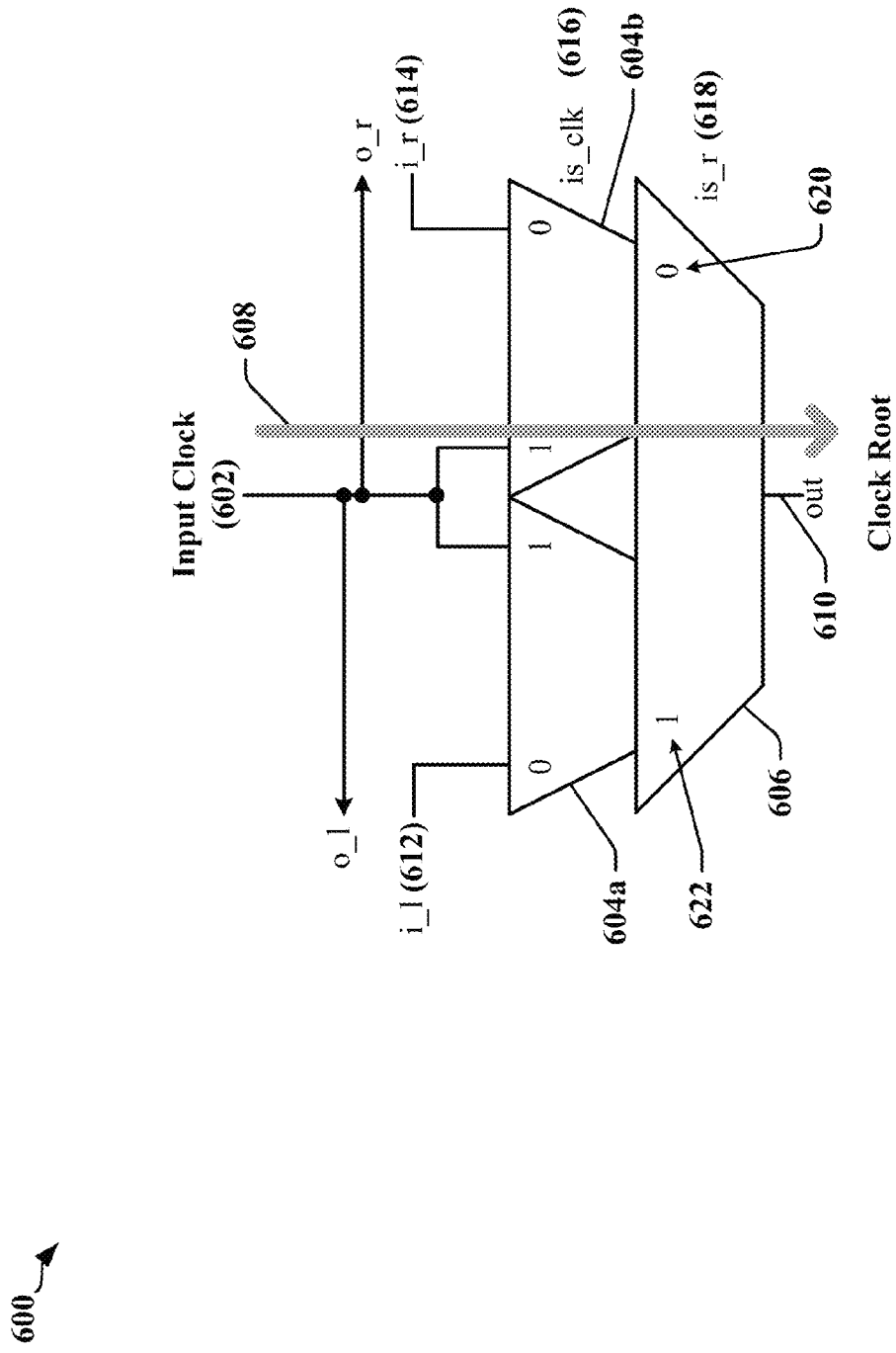
FIG. 6 is a block diagram illustrating a delay cell according to certain aspects disclosed herein.

FIG. 6 is a block diagram illustrating a delay cell 600 of a modular clock tree that may be employed, for example, in the D-PHY layers 408 and/or 428 to provide, configure and/or adapt a clock that controls data transmission. The delay cell 600 may be configured to permit selection of the source of a clock 610 to be output by the delay cell 600. Potential sources may include different versions of a base input clock 602, including advanced and delayed versions of the base clock 602 provided at left side input 612 and a right-side input 614, respectively. In one example, lanes may be deployed to the left and right of the physical location of the root lane, of which delay cell 600 may be an element. With respect to the illustrated delay cell 600, the use of the terms "right" and "left" in reference to lane structure and signals is figurative and is not intended to impute any physical attribute or characteristic to the design, structure or configuration of the delay cell 600.

The delay cell 600 is configurable in that the output 610 may be selected from the three inputs 602, 612, and 614. In one example, control signals is_clk 616 and is_r 618 control multiplexers 604a, 604b, and 606. First-level multiplexing is provided by the two first-level multiplexers 604a, 604b that are controlled by the is_clk signal 616, while the multiplexer 606 provides second-level multiplexing and is controlled by the is_r signal 618. In one example, the delay cell 600 passes the clock root (i.e. the input clock signal 602) to the output 610, as indicated by the thick line 608. In this example, the is_clk signal 616 is set to logic 1 causing both first-level multiplexers 604a and 604b to pass the root clock through to the inputs of the second-level multiplexer 606. The is_r signal 618 selects between right input (labeled 0) 620 and left input (labeled 1) 622 of the second-level multiplexer 606. The value of the is_r signal 618 may be immaterial when both inputs to the second layer multiplexer 606 receive the clock root; that is, when the is_clk signal 616 is set to logic 1. In some examples, the is_r signal 618 may be used to suppress the output of the delay cell 600 in power-down mode, when the is_clk signal 616 is set to logic 1. When the is_clk signal 616 is set to logic 0, the second-level multiplexer 606 selects between the signals provided at the left (i_l) input 612 and the right (i_r) input 614.

Figure 7:
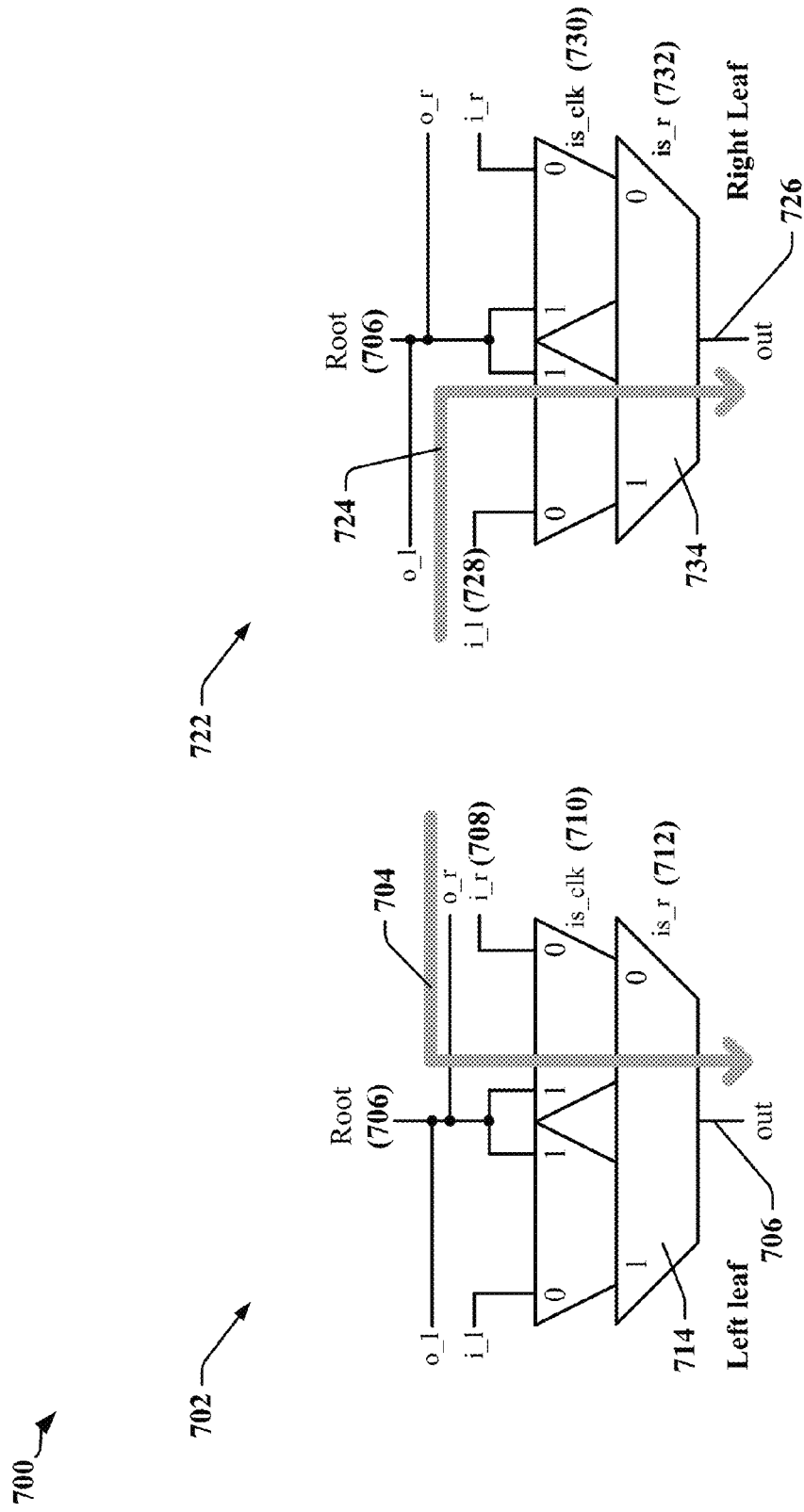
FIG. 7 illustrates the operation of delay cells according to certain aspects disclosed herein.

FIG. 7 is a diagram 700 that illustrates the operation of two delay cells 702 and 722 when the is_clk signal 710 and 730 is set to 0. The two delay cells 702, 722 may be left and right leaves in a configurable clock tree circuit as described herein. In one delay cell 702, the right (i_r) input 708 may be provided at the output 706 of the delay cell 702 when the is_clk signal 710 is set to logic 0 and the is_r signal 712 is set to logic 1. In the other delay cell 722 the left (i_l) input 728 may be provided at the output 726 of the delay cell 722 when the is_clk signal 730 is set to logic 0 and the is_r signal 732 is set to logic 0.

In the example, the is_r signal 712 for the left leaf delay cell 702 is set to 0, thereby selecting the right side input of the second-level multiplexer 714, and the output 706 of the left leaf delay cell 702 accordingly follows the right-side input 708 as shown by the thick line 704. The is_r signal 732 for the right leaf delay cell 722 is set to 1, thereby selecting the left side input of the second-level multiplexer 734, and the output 726 of the right leaf delay cell 722 accordingly follows the left-side input 728 as shown by the thick line 724.

According to certain aspects disclosed herein, a plurality of the configurable clock delay cells 600, 702, 722 may be used to create a stack of 4-to-1 multiplexers that can determine the delay path either from the clock root or from left or right side data lanes, and/or power down the delay path. The stack may be formed in a matrix of delay cells 600 arranged in two or more levels, whereby each delay cell 600 in the matrix can select from a primary input as well as left and right inputs which typically include timing advances or delays with respect to the primary input. The delay cells 600 may also be configured to enter a power down, or low-power mode when a fourth path (i.e. fourth "dummy" or duplicate input selected as an output 610) is selected. The clock tree delay path crossing lanes (i.e. left-to-right or right-to-left) for each lane, and between lanes, are based on the same configuration of transistor device paths, and delay variations may be limited to variations in metal (resistance-capacitance) RC values which are subject to small process, voltage and temperature (PVT) variation. Accordingly, physical designs can be easily manipulated to obtain metered RC delay match. The matched transistor paths may eliminate the need for clock tree balance crossing lanes.

Figure 8:
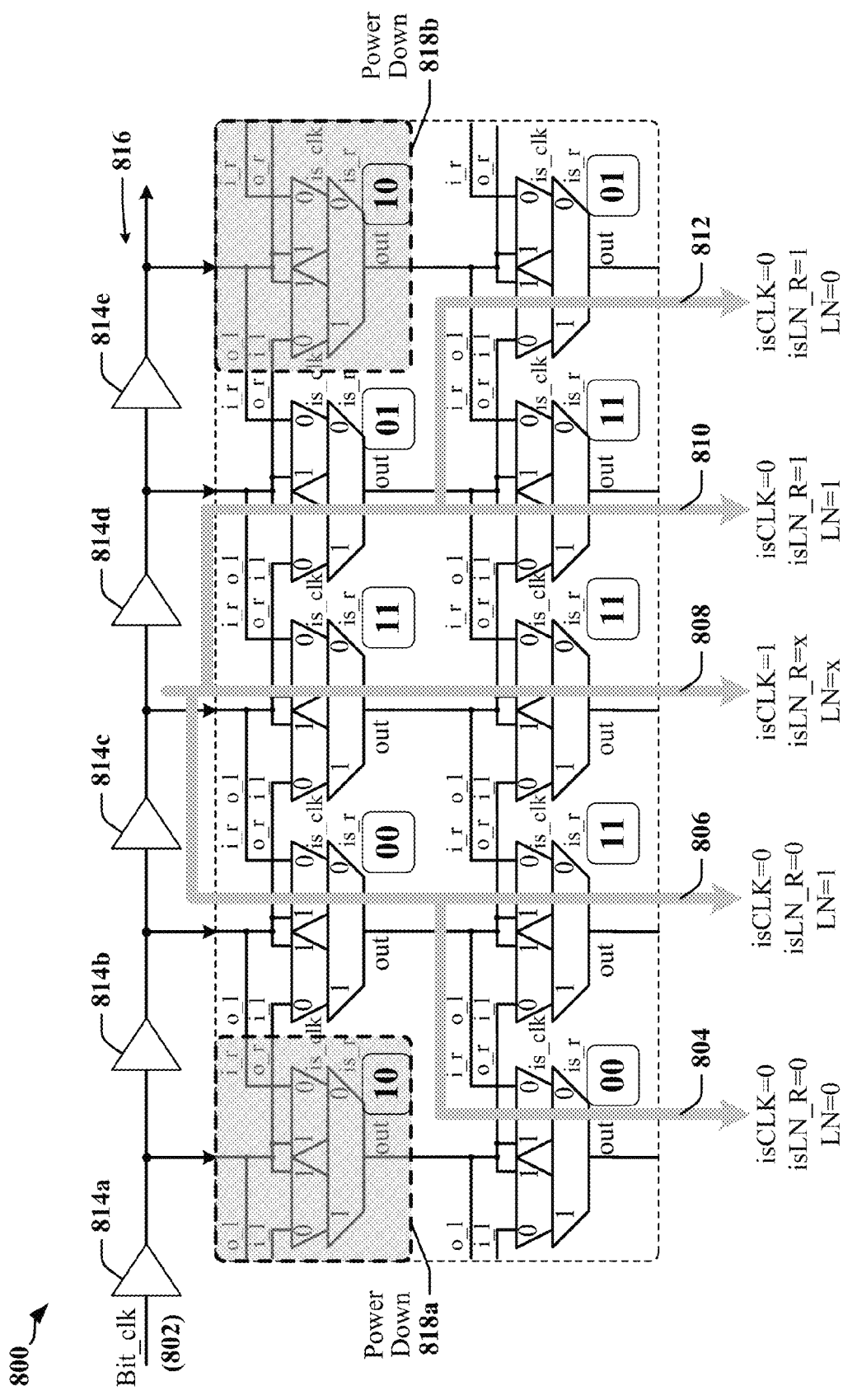
FIG. 8 illustrates a software-configurable clock tree circuit according to certain aspects disclosed herein.

FIG. 8 is a block schematic diagram illustrating a first example in which multiple clocks may be obtained from a software-configurable clock tree circuit 800. Clocks 804, 806, 810 and 812 are generated for two right lanes and two left lanes, along with a root clock 808. It will be appreciated that the root clock 808 may be selected from various points in a delay line 816, which provides multiple delayed versions of the source bit-clock 802. The delay line 816 may be implemented with series connected delay elements, which may include buffer devices 814a-814e. The root clock 808 may be selected by configuring the various is_r and is_clk signals to direct the desired clock source to the output pin 808, without increasing the number of logic elements between clock source and output pin 808. Each of a plurality of clock outputs 804, 806, 810, and/or 812 may be similarly configured. In the configuration illustrated in FIG. 8, two of the configurable clock delay cells 818a, 818b are not included in the trees that provide the clocks 804, 806, 808, 810 and 812 and these configurable clock delay cells 818a, 818b may be powered down.

Figure 9:
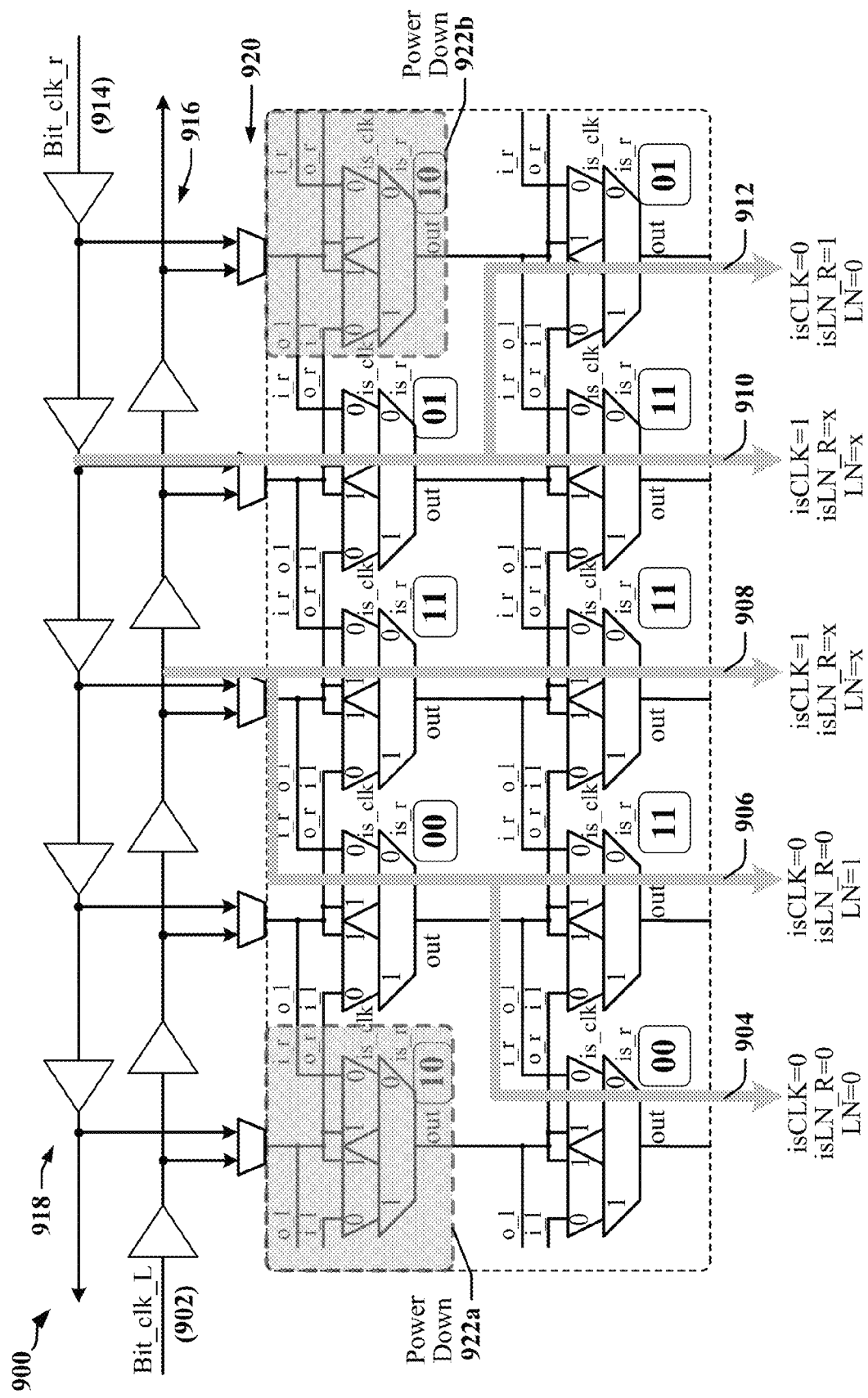
FIG. 9 illustrates an example in which multiple root clocks may be obtained from a software-configurable clock tree circuit according to certain aspects disclosed herein.

FIG. 9 is a block schematic diagram illustrating a second example in which multiple clocks may be obtained from a software-configurable clock tree circuit 900. Here, a left bit clock source 902 and right bit clock source 914 may be provided to respective left and right delay lines 916, 918. The left bit clock source 902 and right bit clock source 914 may be derived from two different root clock sources, and may have the same or different frequencies. A root clock 908 and lane clocks 904, 906, 910 and 912 for two left lanes and two right lanes may be generated with configurable relative timing from the left bit clock source 902 and/or the right bit clock source 914, as illustrated in FIG. 8. An additional level of multiplexing 920 may be provided to select between clocks derived from the left bit clock source 902 and right bit clock source 914. The use of "left and right" in qualifying lanes and corresponding clocks may be literal or figurative, but may relate to physical location of data lanes about a root clock lane in some instances. The example in FIG. 9 illustrates a first root clock 908 that may be software-configured to choose a left bit clock source 902, and a second root clock 910 that may be software-configured to choose a right bit clock source 914, which may have the same or a different clock frequency than the left bit clock source 902. The clock tree circuit may be configured such that two left lanes 904 and 906 may be based on the first root clock 908, and a right lane 912 may be based on the second root clock 910. In the configuration illustrated in FIG. 8, two of the configurable clock delay cells 922a, 922b are not included in the trees that provide the clocks 904, 906, 908, 910 and 912 and these configurable clock delay cells 922a, 922b may be powered down.

Figure 10:
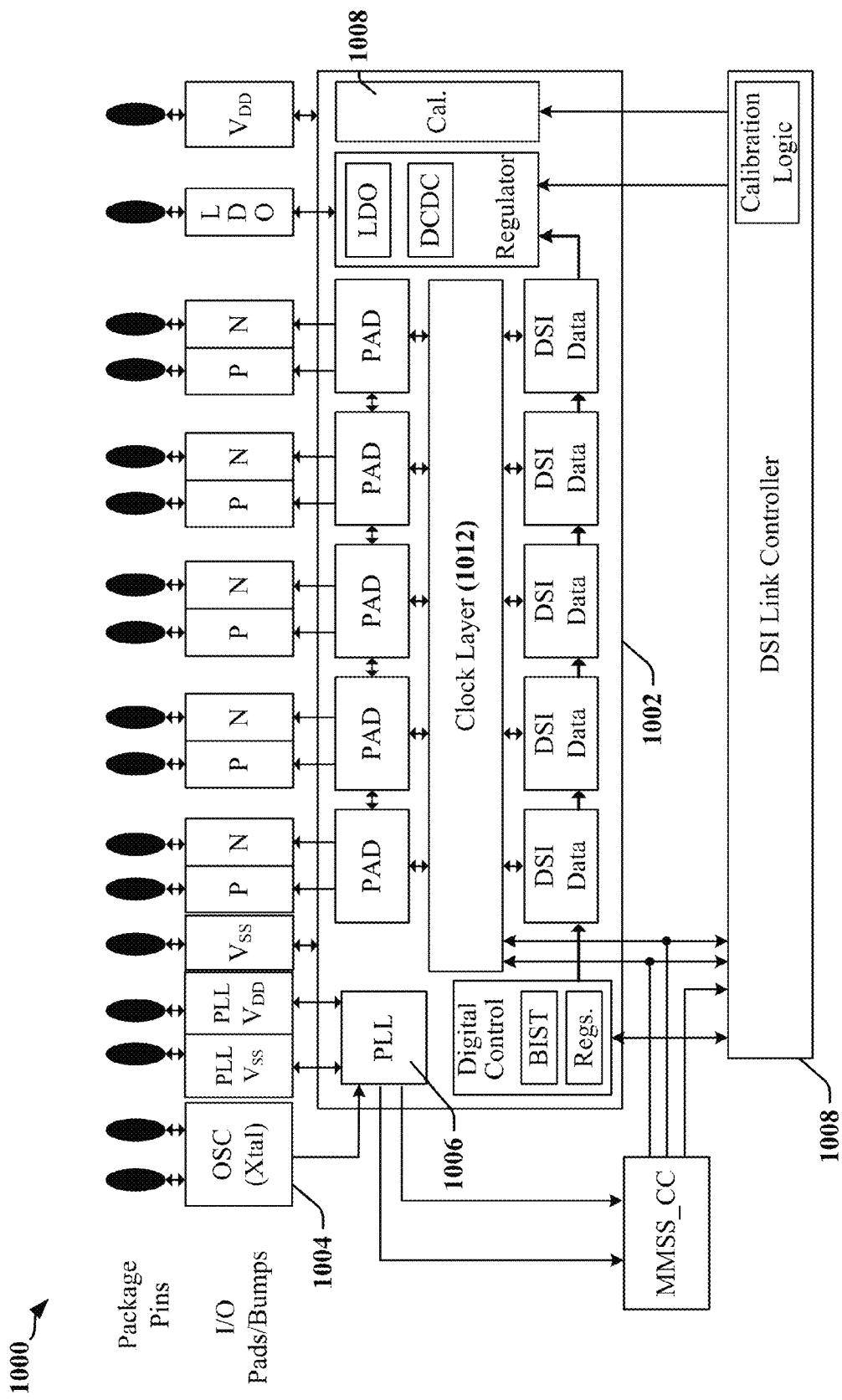
FIG. 10 illustrates the implementation of a software-configurable clock tree in a clock layer of 45 nm IC according to certain aspects disclosed herein.

FIG. 10 is a diagram 1000 illustrating an example of a DSI PHY circuit 1002 provided on a 45 nm IC device. The PHY circuit 1002 may include a clock layer 1012 adapted according to certain aspects disclosed herein. For example, the clock layer may a software-configurable clock tree. The software-configurable clock tree may be configured by a DSI link controller 1008, for example. The configuration of the software-configurable clock tree may be based on information obtained from calibration logic 1008, which may generate calibration information using built-in self test (BIST) patterns, or the like. The software-configurable clock tree may use a base clock that is obtained from clock generation circuitry, including a phase-locked loop 1006, for example.

Figure 11:
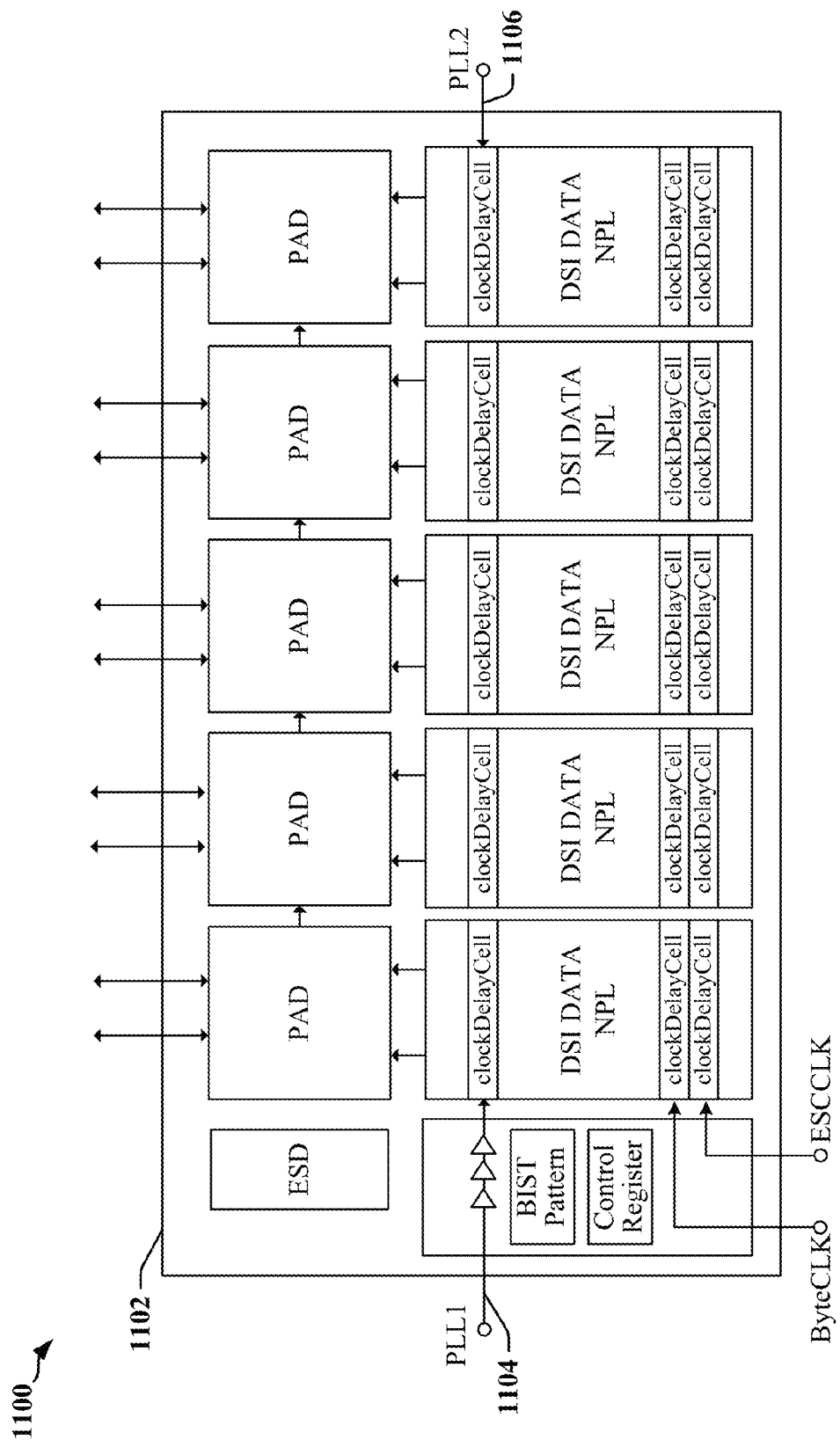
FIG. 11 illustrates the implementation of software-configurable clock delay cells in a 28 nm IC according to certain aspects disclosed herein.

FIG. 11 is a diagram 1100 illustrating an example of the implementation of software-configurable clock delay cells in a 28 nm integrated circuit 1102. Left and right flowing source clocks 1104 and 1106 may be provided to one or more software-configurable clock trees in order to obtain a set of clocks with metered RC delay matching.

Figure 12:
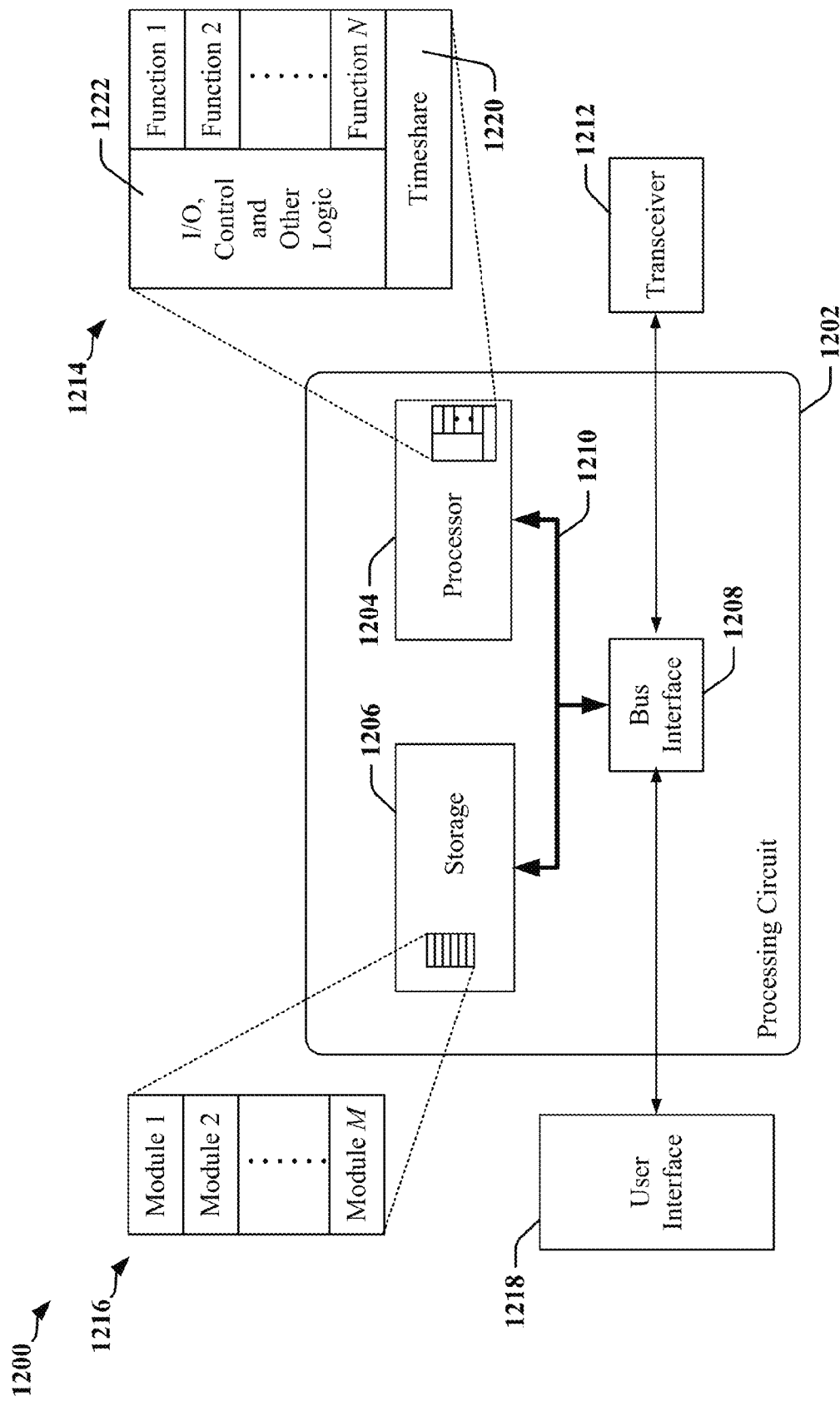
FIG. 12 is a block diagram illustrating an example of an apparatus employing a processing system that may be adapted according to certain aspects disclosed herein.

FIG. 12 is a conceptual diagram 1200 illustrating a simplified example of a hardware implementation for an apparatus employing a processing circuit 1202 that may be configured to perform one or more functions disclosed herein. For example, the processing circuit may be deployed as the processing circuit 102 of FIG. 1, at least a portion of the device 202 or the device 230 of FIG. 2, the processing circuit 502 of FIG. 5, the DSI Link controller 1008 of FIG. 10, etc. In accordance with various aspects of the disclosure, an element, or any portion of an element, or any combination of elements as disclosed herein may be implemented using the processing circuit 1202. The processing circuit 1202 may include one or more processors 1204 that are controlled by some combination of hardware and software modules. Examples of processors 1204 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1204 may include specialized processors that perform specific functions, and that may be configured, augmented or controlled by one of the software modules 1216. The one or more processors 1204 may be configured through a combination of software modules 1216 loaded during initialization, and further configured by loading or unloading one or more software modules 1216 during operation.

In the illustrated example, the processing circuit 1202 may be implemented with a bus architecture, represented generally by the bus 1210. The bus 1210 may include any number of interconnecting buses and bridges depending on the specific application of the processing circuit 1202 and the overall design constraints. The bus 1210 links together various circuits including the one or more processors 1204, and storage 1206. Storage 1206 may include memory devices and mass storage devices, and may be referred to herein as computer-readable media and/or processor-readable media. The bus 1210 may also link various other circuits such as timing sources, timers, peripherals, voltage regulators, and power management circuits. A bus interface 1208 may provide an interface between the bus 1210 and one or more transceivers 1212. A transceiver 1212 may be provided for each networking technology supported by the processing circuit. In some instances, multiple networking technologies may share some or all of the circuitry or processing modules found in a transceiver 1212. Each transceiver 1212 provides a means for communicating with various other apparatus over a transmission medium. Depending upon the nature of the apparatus, a user interface 1218 (e.g., keypad, display, speaker, microphone, joystick) may also be provided, and may be communicatively coupled to the bus 1210 directly or through the bus interface 1208.

A processor 1204 may be responsible for managing the bus 1210 and for general processing that may include the execution of software stored in a computer-readable medium that may include the storage 1206. In this respect, the processing circuit 1202, including the processor 1204, may be used to implement any of the methods, functions and techniques disclosed herein. The storage 1206 may be used for storing data that is manipulated by the processor 1204 when executing software, and the software may be configured to implement any one of the methods disclosed herein.

One or more processors 1204 in the processing circuit 1202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1206 or in an external computer readable medium. The external computer-readable medium and/or storage 1206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1206 may also include, by way of example, a carrier wave, a transmission line, and any other suitable medium for transmitting software and/or instructions that may be accessed and read by a computer. Computer-readable medium and/or the storage 1206 may reside in the processing circuit 1202, in the processor 1204, external to the processing circuit 1202, or be distributed across multiple entities including the processing circuit 1202. The computer-readable medium and/or storage 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1206 may maintain software maintained and/or organized in loadable code segments, modules, applications, programs, etc., which may be referred to herein as software modules 1216. Each of the software modules 1216 may include instructions and data that, when installed or loaded on the processing circuit 1202 and executed by the one or more processors 1204, contribute to a run-time image 1214 that controls the operation of the one or more processors 1204. When executed, certain instructions may cause the processing circuit 1202 to perform functions in accordance with certain methods, algorithms and processes described herein.

Some of the software modules 1216 may be loaded during initialization of the processing circuit 1202, and these software modules 1216 may configure the processing circuit 1202 to enable performance of the various functions disclosed herein. For example, some software modules 1216 may configure internal devices and/or logic circuits 1222 of the processor 1204, and may manage access to external devices such as the transceiver 1212, the bus interface 1208, the user interface 1218, timers, mathematical coprocessors, and so on. The software modules 1216 may include a control program and/or an operating system that interacts with interrupt handlers and device drivers, and that controls access to various resources provided by the processing circuit 1202. The resources may include memory, processing time, access to the transceiver 1212, the user interface 1218, and so on.

One or more processors 1204 of the processing circuit 1202 may be multifunctional, whereby some of the software modules 1216 are loaded and configured to perform different functions or different instances of the same function. The one or more processors 1204 may additionally be adapted to manage background tasks initiated in response to inputs from the user interface 1218, the transceiver 1212, and device drivers, for example. To support the performance of multiple functions, the one or more processors 1204 may be configured to provide a multitasking environment, whereby each of a plurality of functions is implemented as a set of tasks serviced by the one or more processors 1204 as needed or desired. In one example, the multitasking environment may be implemented using a timesharing program 1220 that passes control of a processor 1204 between different tasks, whereby each task returns control of the one or more processors 1204 to the timesharing program 1220 upon completion of any outstanding operations and/or in response to an input such as an interrupt. When a task has control of the one or more processors 1204, the processing circuit is effectively specialized for the purposes addressed by the function associated with the controlling task. The timesharing program 1220 may include an operating system, a main loop that transfers control on a round-robin basis, a function that allocates control of the one or more processors 1204 in accordance with a prioritization of the functions, and/or an interrupt driven main loop that responds to external events by providing control of the one or more processors 1204 to a handling function.

Figure 13:
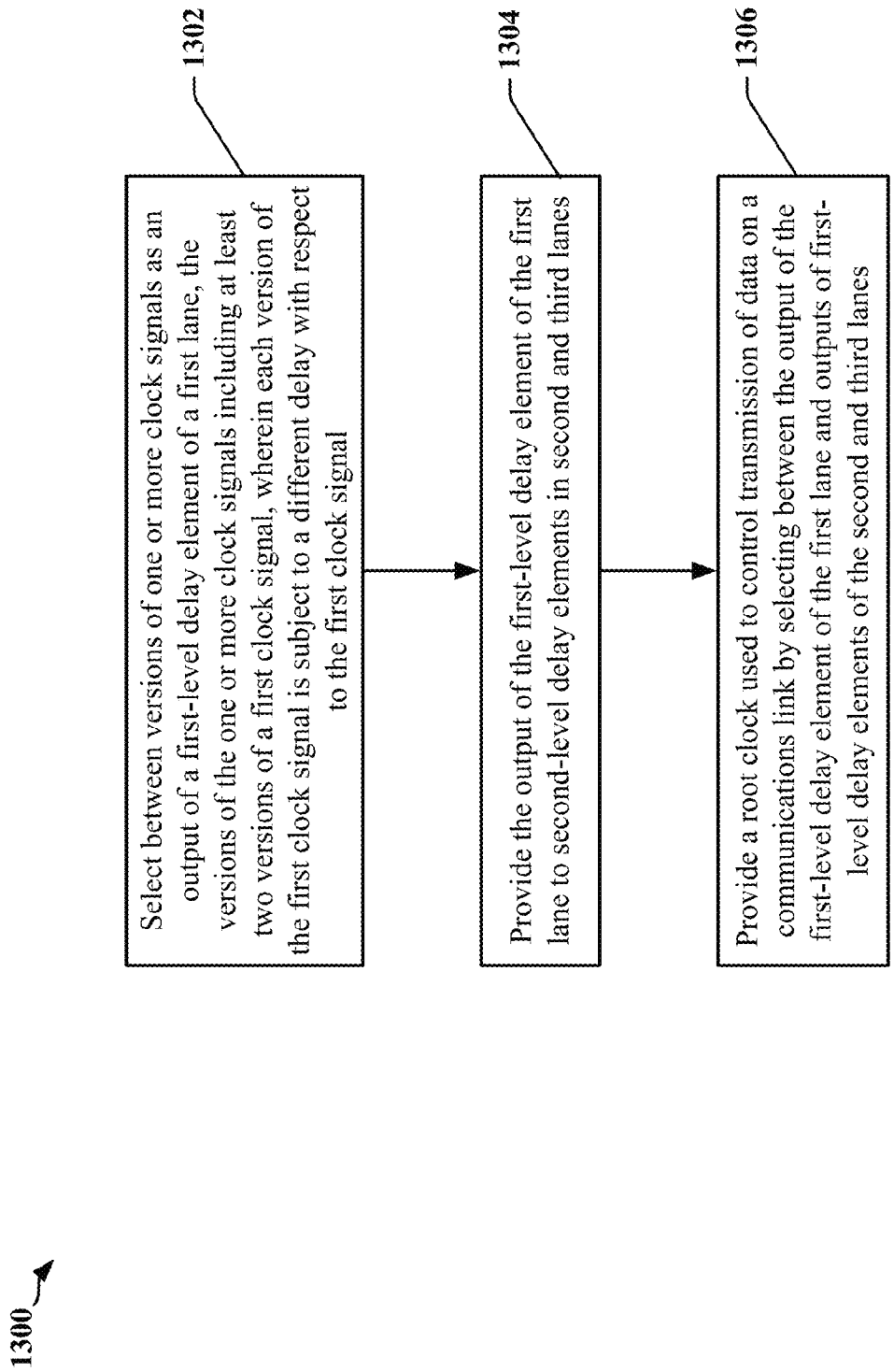
FIG. 13 is a flow chart of a method for data transfer according to certain aspects disclosed herein.

FIG. 13 is a flowchart 1300 that illustrates the operation of a configurable clock tree clock circuit. The configurable clock tree clock circuit may be provided on semiconductor IC device or the like. The configurable clock tree clock circuit may include a delay matrix adapted and/or configurable according to certain aspects disclosed herein. The flowchart 1300 may relate to an IC device that includes an interface to a data communications link.

At step 1302, an output of a first-level delay element of a first lane is selected. The output of the first-level delay element may be selected from versions of one or more clock signals. The versions of the one or more clock signals may include at least two versions of a first clock signal, and each version of the first clock signal may be subject to a different delay with respect to the first clock signal.

At step 1304, the output of the first-level delay element of the first lane may be provided to second-level delay elements in second and third lanes.

At step 1306, a root clock may be provided. The root clock may be used to control transmission of data on the communications link by selecting between the output of the first-level delay element of the first lane and outputs of first-level delay elements of the second and third lanes.

In an aspect of the disclosure, the first lane may have a transistor path that matches a transistor path of one or more data lanes.

In an aspect of the disclosure, the first, second and third lanes may provide clocks to be used in corresponding data lanes of the communications link. Inputs for the first level delay element of the first lane and the inputs for a second-level delay element in the first lane may be selected to minimize skew between the root clock and the clocks provided by the second and third lanes. Inputs for first level delay elements of the second and third lanes and the inputs for second-level delay elements of the second and third lanes may be selected to minimize skew between the root clock and the clocks provided by the second and third lanes. Inputs for first level delay elements of the second and third lanes and the inputs for second-level delay elements of the second and third lanes are selected to minimize skew between data lanes associated with the root clock and data lanes associated with the clocks provided by the second and third lanes.

In an aspect of the disclosure, differentially encoded data and clock signals are transmitted on the communications link. The communications link may communicatively couple a first IC device with a second IC device. The communications link may include interconnects within an IC device, on a chip carrier and/or other circuit board. In one example, the interconnects may be provided as traces formed in a metallization layer of a semiconductor IC device. The first and second IC devices may be semiconductor devices. The first and second IC devices may include a semiconductor IC device such as the IC devices illustrated in FIGS. 10 and 11.

In an aspect of the disclosure, the one or more clock signals includes a left clock signal that is delayed by one or more of a first plurality of delay cells and a right clock signal that is delayed by one or more of a second plurality of delay cells. In one example, the first plurality of delay cells may include a number of buffer devices corresponding to a number of data lanes disposed to the left of a first data lane on an IC. The second plurality of delay cells may include a number of delay cells corresponding to a number of data lanes disposed to the right of the first data lane. In one example, selecting between versions of the one or more clock signals as an output of the first-level delay element of the first lane includes selecting between the left clock signal and the right clock signal.

In an aspect of the disclosure, the first level delay element and second level delay element may include multiplexing logic configured to select between versions of one or more clock signals provided as inputs to the multiplexing logic. Multiplexing logic that does not provide an output used to provide the root clock may be powered down. A controller may be configured to select between an active clocking mode and a power-down mode for portions of multiplexing logic in the first level delay elements and the second-level delay elements.

In an aspect of the disclosure, the means for selecting versions of one or more clock signals as an output of a first-level delay element of a first lane may include a plurality of multiplexers 604a, 604b and 606 (see FIG. 6) arranged in two multiplexing levels. The means for selecting versions of one or more clock signals as an output of a first-level delay element of a first lane may further include control signals 612, 614, 616 and 618 that may be generated by a controller or processor to configure an array, matrix or stack of delay elements 600.

In an aspect of the disclosure, first-level delay elements of the first, second and third lanes may include a plurality of multiplexers 604a, 604b and 606 arranged in two multiplexing levels. Versions of one or more clock signals 602, 612, 614 may be selected as an output of a first-level delay element of a first lane using one or more control signals 616 and 618 that may be generated by a controller or processor used to configure an array, matrix or stack of delay elements or cells 600. The delay cells 600 in one or more clock lanes may be configured to match the configuration of data lanes used to provide signals for transmission over the communications link. The clock lanes and data lanes may include portions that are formed in the same matrix of delay cells.

In an aspect of the disclosure, a clock delay matrix includes a plurality of clock lanes on an IC device. Each clock lane may include delay cells configured to provide a clock for controlling data transmissions in a corresponding data lane. Each clock lane may include first-level multiplexers configured to select between three delayed versions of one or more base clocks, a second-level multiplexer configured to select between an output of the first-level multiplexers and outputs of first-level multiplexers for two different clock lanes, and a controller that configures first-level multiplexers and second-level multiplexers of the plurality of clock lanes to minimize clock skew between outputs of the plurality of clock lanes and corresponding data lanes.

Figure 14:
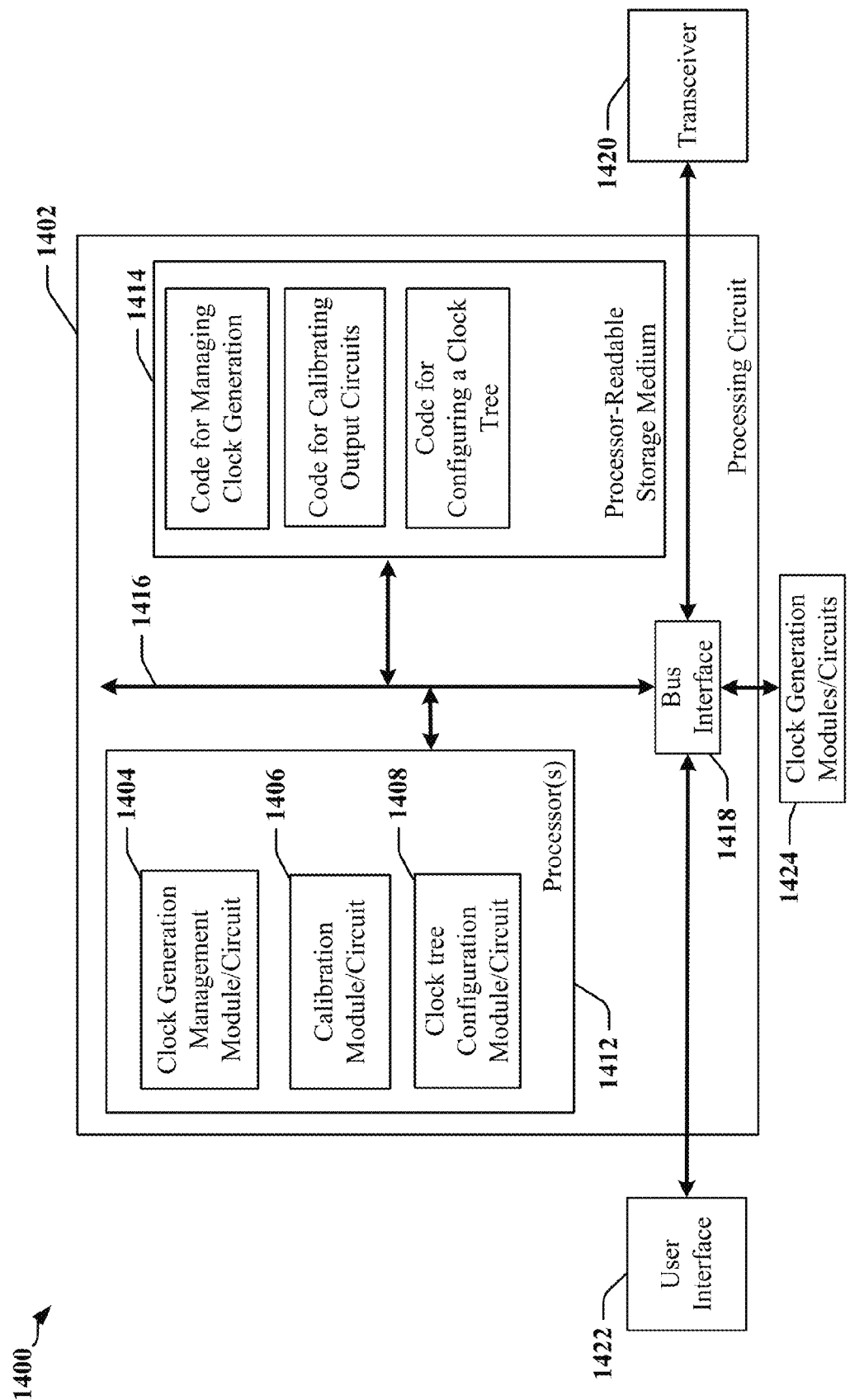
FIG. 14 is a diagram illustrating an example of a hardware implementation for an apparatus that may be used to configure a clock tree according to certain aspects disclosed herein.

FIG. 14 is a conceptual diagram illustrating an example of a hardware implementation for an apparatus 1400 employing a processing circuit 1402. In this example, the processing circuit 1402 may be implemented with a bus architecture, represented generally by the bus 1416. The bus 1416 may include any number of interconnecting buses and bridges depending on the specific application of the processing circuit 1402 and the overall design constraints. The bus 1416 links together various circuits including one or more processors, represented generally by the processor 1412, and computer-readable media, represented generally by the processor-readable storage medium 1414. The bus 1416 may also link various other circuits such as timing sources, timers, peripherals, voltage regulators, and power management circuits. A bus interface 1418 provides an interface between the bus 1416 and a transceiver 1420. The transceiver 1420 may include a bus interface that provides a means for communicating with various other apparatus over a transmission medium. Depending upon the nature of the apparatus, a user interface 1422 (e.g., keypad, display, speaker, microphone, joystick) may also be provided. One or more clock generation circuits or modules 1424 may be provided within the processing circuit 1402 or controlled by processing circuit 1402 and/or one or more processors 1412. In one example, the clock generation circuits or modules 1424 may include one or more crystal oscillators, one or more phase-locked loop devices, and/or one or more configurable clock trees.

The processor 1412 is responsible for managing the bus 1416 and general processing, including the execution of software stored on the processor-readable storage medium 1414. The software, when executed by the processor 1412, causes the processing circuit 1402 to perform the various functions described supra for any particular apparatus. The processor-readable storage medium 1414 may be used for storing data that is manipulated by the processor 1412 when executing software.

In one configuration, the processing circuit may include modules and/or circuits 1404, 1424 for clock generation, which may include a PLL, a configurable clock tree and other logic and circuitry. The processing circuit may include one or more calibration modules and/or circuits 1406, which may include modules and/or circuits for BIST pattern generation, transmission wire monitoring, error detection, and the like. The processing circuit may include modules and/or circuits 1408 for configuring a clock tree. In one example, the modules and/or circuits 1408 may cooperate to select one or more versions at least one clock signal as an output of a first-level delay element of a first lane, provide the output of the first-level delay element of the first lane to second-level delay elements in second and third lanes, and select between the output of the first-level delay element of the first lane and outputs of first-level delay elements of the second and third lanes to provide a root clock used for transmitting data on a communications link.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for data communications comprising:
    selecting between versions of one or more clock signals as an output of a first-level delay element of a first lane, the versions of the one or more clock signals including at least two versions of a first clock signal, wherein each version of the first clock signal is subject to a different delay with respect to the first clock signal;
    providing the output of the first-level delay element of the first lane to second-level delay elements in second and third lanes, wherein the first lane and the second and third lanes provide clocks to be used in corresponding data lanes;
    providing a root clock used to control transmission of data on a communications link by selecting between the output of the first-level delay element of the first lane and outputs of first-level delay elements of the second and third lanes; and
    selecting inputs for a first level delay element of at least one lane and for second-level delay elements of one or more lanes to minimize skew between the root clock and the clocks provided by the second and third lanes.

2. The method of claim 1, wherein the first lane has a transistor path that matches a transistor path of one or more data lanes.

3. The method of claim 1, wherein inputs for the first level delay element of the first lane and the inputs for a second-level delay element in the first lane are selected to minimize skew between the root clock and the clocks provided by the second and third lanes.

4. The method of claim 1, wherein inputs for first level delay elements of the second and third lanes and the inputs for second-level delay elements of the second and third lanes are selected to minimize skew between the root clock and the clocks provided by the second and third lanes.

5. The method of claim 1, wherein inputs for first level delay elements of the second and third lanes and the inputs for second-level delay elements of the second and third lanes are selected to minimize skew between data lanes associated with the root clock and data lanes associated with the clocks provided by the second and third lanes.

6. The method of claim 1, wherein the communications link comprises differentially encoded data and clock signals.

7. The method of claim 1, wherein the communications link communicatively couples a first integrated circuit (IC) device with a second IC device.

8. The method of claim 1, wherein the one or more clock signals includes a left clock signal that is delayed by one or more of a first plurality of delay elements and a right clock signal that is delayed by one or more of a second plurality of delay elements, wherein the first plurality of delay elements includes a number of delay elements corresponding to a number of data lanes disposed to the left of a first data lane on an IC, and wherein the second plurality of delay elements includes a number of delay elements corresponding to a number of data lanes disposed to the right of the first data lane.

9. The method of claim 8, wherein selecting between versions of the one or more clock signals as an output of the first-level delay element of the first lane comprises:
    selecting between the left clock signal and the right clock signal.

10. The method of claim 8, wherein selecting between versions of the one or more clock signals as an output of the first-level delay element of the first lane comprises:
    selecting between an active clocking mode and a power-down mode for each first-level delay element.

11. The method of claim 1, further comprising:
    powering down one or more delay elements that do not contribute to the provision of the root clock.

12. An apparatus comprising:
    an interface to a communications link that communicatively couples a first integrated circuit (IC) device with a second IC device;
    means for selecting between versions of one or more clock signals as an output of a first-level delay element of a first clock lane, wherein the versions of the one or more clock signals include at least two versions of a first clock signal, wherein each version of the first clock signal is subject to a different delay with respect to the first clock signal;
    means for providing a root clock as an output of the first clock lane, wherein the root clock is used for transmitting data on the communications link, wherein the means for providing the root clock includes selection logic configured to select between the output of the first-level delay element of the first clock lane and outputs of first-level delay elements of a plurality of other clock lanes; and
    means for selecting inputs for a first level delay element of at least one clock lane and for second-level delay elements of one or more clock lanes to minimize skew between the root clock and clocks provided by the other clock lanes, wherein the root clock and output clocks provided by the plurality of other clock lanes are used in corresponding data lanes.

13. The apparatus of claim 12, wherein the first clock lane has a transistor path that matches a corresponding transistor path in one or more data lanes.

14. The apparatus of claim 12, wherein inputs for the first level delay element of the first clock lane and the inputs for a second-level delay element in the first clock lane are selected to minimize skew between the root clock and the output clocks provided by the plurality of other clock lanes.

15. The apparatus of claim 12, wherein inputs for first level delay elements of the plurality of other clock lanes and the inputs for second-level delay elements of the plurality of other clock lanes are selected to minimize skew between the root clock and the output clocks provided by the plurality of other clock lanes.

16. The apparatus of claim 12, wherein inputs for first level delay elements of the plurality of other clock lanes and the inputs for second-level delay elements of the plurality of other clock lanes are selected to minimize skew between data lanes associated with the root clock and data lanes associated with the output clocks provided by the plurality of other clock lanes.

17. The apparatus of claim 12, wherein the one or more clock signals includes a left clock signal that is delayed by one or more of a first plurality of delay elements and a right clock signal that is delayed by one or more of a second plurality of delay elements, wherein the first plurality of delay elements includes a number of delay elements corresponding to a number of data lanes disposed to the left of a first data lane on an IC, and wherein the second plurality of delay elements includes a number of delay elements corresponding to a number of data lanes disposed to the right of the first data lane.

18. The apparatus of claim 17, wherein the means for selecting between versions of the one or more clock signals includes logic configured to select the left clock signal or the right clock signal as the first clock signal.

19. The apparatus of claim 12, wherein the means for selecting between versions of the one or more clock signals includes logic configured to power down delay elements that have outputs which are not used in the provision of the root clock.

20. The apparatus of claim 12, wherein the means for selecting between versions of the one or more clock signals includes logic configured to select between an active clocking mode and a power-down mode for each first-level delay element.

21. A clock delay matrix comprising:

a plurality of clock lanes on an integrated circuit (IC) device, wherein each clock lane is configurable to provide a clock for controlling data transmissions in a corresponding data lane of a communications interface, and wherein each clock lane includes:

first-level multiplexing logic configured to select between versions of one or more first-level clock signals;

second-level multiplexing logic configured to provide a root clock by selecting between an output of the first-level multiplexing logic and outputs of first-level multiplexing logic of two other clock lanes; and a controller that configures the first-level multiplexing logic and the second-level multiplexing logic of the plurality of clock lanes, wherein the controller is configured to control clock skew between outputs of the plurality of clock lanes by configuring the first level multiplexing logic and the second-level multiplexing logic in the each clock lane to minimize skew between outputs of the each clock lane and the two other clock lanes.

22. The clock delay matrix of claim 21, wherein each clock lane has a transistor path that matches a transistor path in a corresponding data lane.

23. The clock delay matrix of claim 21, wherein the controller controls clock skew by configuring the first level multiplexing logic and the second-level multiplexing logic in each clock lane to minimize skew between data signals transmitted on the communications interface.

24. The clock delay matrix of claim 21, wherein the controller controls clock skew by configuring the first level multiplexing logic and the second-level multiplexing logic in each clock lane to minimize skew between clock and data signals transmitted on the communications interface.

25. The clock delay matrix of claim 21, wherein the one or more first-level clock signals includes a left clock signal that is delayed by one or more of a first plurality of delay elements and a right clock signal that is delayed by one or more of a second plurality of delay elements, wherein the first plurality of delay elements includes a number of delay elements corresponding to a number of data lanes disposed to the left of a first data lane on the IC, and wherein the second plurality of delay elements includes a number of delay elements corresponding to a number of data lanes disposed to the right of the first data lane.

26. The clock delay matrix of claim 25, further comprising:

base clock selection logic that is configurable to provide the left clock signal or the right clock signal as a first-level clock signal.

27. The clock delay matrix of claim 21, wherein the one or more first-level clock signals include the left clock signal and the right clock signal.

28. The clock delay matrix of claim 21, wherein multiplexing logic that does not provide an output used to provide the root clock is powered down.

29. The clock delay matrix of claim 21, wherein the controller is configured to select between an active clocking mode and a power-down mode for portions of the first level multiplexing logic and the second-level multiplexing logic.

* * * * *